(12) United States Patent
Schweid

(10) Patent No.: US 8,180,169 B2
(45) Date of Patent: May 15, 2012

(54) SYSTEM AND METHOD FOR MULTI-SCALE SIGMA FILTERING USING QUADRATURE MIRROR FILTERS

(75) Inventor: Stuart A. Schweid, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 1081 days.

(21) Appl. No.: 12/038,310

(22) Filed: Feb. 27, 2008

(65) Prior Publication Data

US 2009/0214131 A1 Aug. 27, 2009

(51) Int. Cl.
*G06K 9/40* (2006.01)
(52) U.S. Cl. ........ 382/260; 382/261; 382/262; 382/263; 382/264; 382/265; 382/266; 382/232; 348/342; 348/349; 348/354; 348/618; 348/619
(58) Field of Classification Search .......... 382/260–266, 382/232; 348/342, 349, 354, 618, 619
See application file for complete search history.

(56) References Cited

U.S. PATENT DOCUMENTS

| | | | | |
|---|---|---|---|---|
| 4,573,070 A * | 2/1986 | Cooper | ......................... | 348/617 |
| 5,001,429 A * | 3/1991 | Constable et al. | ............ | 324/312 |
| 5,010,405 A * | 4/1991 | Schreiber et al. | .......... | 348/432.1 |
| 5,343,309 A * | 8/1994 | Roetling | ...................... | 358/3.07 |
| 5,745,063 A * | 4/1998 | Gruber et al. | ................. | 341/143 |
| 5,923,775 A * | 7/1999 | Snyder et al. | .................. | 382/172 |
| 6,181,829 B1 * | 1/2001 | Clark et al. | .................... | 382/273 |
| 6,205,257 B1 * | 3/2001 | Eschbach | ...................... | 382/261 |
| 6,373,992 B1 * | 4/2002 | Nagao | ........................... | 382/266 |
| 6,549,658 B1 * | 4/2003 | Schweid et al. | ............... | 382/173 |
| 6,628,842 B1 * | 9/2003 | Nagao | ........................... | 382/266 |
| 6,633,683 B1 * | 10/2003 | Dinh et al. | ..................... | 382/260 |
| 6,721,448 B2 * | 4/2004 | Rao et al. | ....................... | 382/164 |
| 6,760,482 B1 * | 7/2004 | Taubman | ....................... | 382/240 |
| 6,847,737 B1 * | 1/2005 | Kouri et al. | .................... | 382/260 |
| 6,864,994 B1 * | 3/2005 | Harrington | ..................... | 358/1.9 |
| 6,907,144 B1 * | 6/2005 | Gindele | ......................... | 382/275 |
| 6,947,178 B2 * | 9/2005 | Kuo et al. | ..................... | 358/3.08 |
| 6,947,597 B2 * | 9/2005 | Lin et al. | ....................... | 382/224 |
| 7,139,437 B2 * | 11/2006 | Jones et al. | ..................... | 382/261 |
| 7,437,013 B2 * | 10/2008 | Anderson | ...................... | 382/261 |
| 7,570,831 B2 * | 8/2009 | Shaked et al. | ................ | 382/260 |
| 7,755,802 B2 * | 7/2010 | Tai et al. | ....................... | 358/3.24 |
| 8,055,093 B2 * | 11/2011 | Schweid | ....................... | 382/275 |
| 8,090,215 B2 * | 1/2012 | Schweid | ....................... | 382/275 |

(Continued)

OTHER PUBLICATIONS

Digital image—Sigma filter, Lee Jong-Sen, CVGAIP 24, 1983, pp. 255-269.*

(Continued)

*Primary Examiner* — Jayesh A Patel
(74) *Attorney, Agent, or Firm* — Michael J. Nickerson; Basch & Nickerson LLP

(57) ABSTRACT

A first sigma filtering circuit sigma filters an image to produce a filtered image. An analysis circuit processes the sigma filtered image to produce an approximation part and a detail part. A second sigma filter circuit filters the approximation part to produce a sigma filtered approximation part. Another analysis circuit process the sigma filtered approximation part to produce a second approximation part and a second detail part. A third sigma filter circuit sigma filters the second approximation part to produce a sigma filtered second filtered approximation part. A first synthesizer synthesizes the sigma filtered second filtered approximation part and the second detailed part to produce a first reconstructed image, and a second synthesizer synthesizes the first reconstructed image and the first detail part to produce a final filtered image.

20 Claims, 5 Drawing Sheets

U.S. PATENT DOCUMENTS

| | | | |
|---|---|---|---|
| 2002/0114512 A1* | 8/2002 | Rao et al. | 382/165 |
| 2002/0154339 A1* | 10/2002 | Kuo et al. | 358/3.08 |
| 2003/0053708 A1* | 3/2003 | Kryukov et al. | 382/261 |
| 2003/0086105 A1* | 5/2003 | Jostschulte | 358/1.9 |
| 2004/0091168 A1* | 5/2004 | Jones et al. | 382/261 |
| 2005/0041883 A1* | 2/2005 | Maurer et al. | 382/260 |
| 2005/0094889 A1* | 5/2005 | Lin et al. | 382/261 |
| 2005/0244075 A1* | 11/2005 | Shaked et al. | 382/260 |
| 2005/0281458 A1* | 12/2005 | Adams et al. | 382/162 |
| 2006/0018537 A1* | 1/2006 | Wu et al. | 382/168 |
| 2007/0172118 A1* | 7/2007 | Pan | 382/162 |
| 2007/0172119 A1* | 7/2007 | Pan et al. | 382/162 |
| 2007/0223834 A1* | 9/2007 | Lertrattanapanich et al. | 382/263 |
| 2009/0214131 A1* | 8/2009 | Schweid | 382/263 |
| 2009/0257673 A1 | 10/2009 | Schweid | |
| 2009/0257674 A1* | 10/2009 | Schweid | 382/263 |
| 2009/0257675 A1 | 10/2009 | Schweid | |

OTHER PUBLICATIONS

Digital image smoothing—sigma filter, Long-Sen Lee, IEEE, 0734-189X, 1983, pp. 255-269.*

Quadrature mirror filter—techniques, P.P Vaidyanathan, IEEE, 0740-7467, 1987, pp. 4-20.*

Lee, Jong-Sen; "Digital Image Smoothing and the Sigma Filter;" *Computer Vision, Graphics, and Image Processing*, 24, 255-269 (1983).

U.S. Appl. No. 12/101,944—An Unofficial Prosecution History Between Oct. 20, 2011 and Feb. 2, 2012 for U.S. Appl. No. 12/101,944, filed Apr. 11, 2008, Published Oct. 15, 2009, As US-2009-0257674-A1; Inventor: Stuart A. Schweid.

An Unoffical Prosecution Historyas of Oct. 19, 2011 for U.S. Appl. No. 12/101,944, filed Apr. 11, 2008, Published Oct. 15, 2009, As US-2009-0257674-A1; Inventor: Stuart A. Schweid.

* cited by examiner

1/16*

| 1 | 2 | 1 |
|---|---|---|
| 2 | 4 | 2 |
| 1 | 2 | 1 |

SYSTEM AND METHOD FOR MULTI-SCALE SIGMA FILTERING USING QUADRATURE MIRROR FILTERS

BACKGROUND

Often it is desired to improve the quality of an original image by utilizing various digital processing techniques. While there exist many software programs that allow a person to perform a wide variety of processing on a digital image, these programs require intensive personal input and often a high level of training to be used effectively. Consequently, there has been a parallel development of techniques that can automatically analyze a digital image and, without any human involvement, improve the image quality.

One particular problem that is commonly encountered is the presence of noise in a digital image. This noise can arise for a variety of reasons and includes both systematic or regular noise and random noise. A number of techniques have been devised to automatically remove noise from a digital image. One common technique is to simply apply some sort of low pass or averaging filter to the image. While this technique and similar techniques are effective in reducing or eliminating noise, simple filtering techniques suffer from the disadvantage that simple filtering also tends to blur the image, reducing its visual quality.

One conventional method for reducing or eliminating noise while avoiding the problem of blurring the image utilizes a sigma filter. The sigma filter works by replacing the value of a pixel with the average of those neighboring pixels that are relatively close to its value. This distance is usually taken to be related to the variance of the image, and hence the noise level. The sigma filter has the advantage of preserving high frequency detail in the image while removing noise.

However, the sigma filter has the disadvantage that the filter kernel needs to be relatively large for the filter to be effective. The large filter requires more extensive computing resources and time, thereby making the sigma filter less desirable.

Therefore, it would be desirable to implement a filtering process that realizes the advantages of a sigma filter, which is reducing or eliminating noise while avoiding the problem of blurring the image, but is more economical in the computing requirements needed to implement it.

BRIEF DESCRIPTION OF THE DRAWING

The drawings are only for purposes of illustrating various embodiments and are not to be construed as limiting, wherein:

FIG. 3 illustrates a small sigma filter kernel;

DETAILED DESCRIPTION

Figure 1:
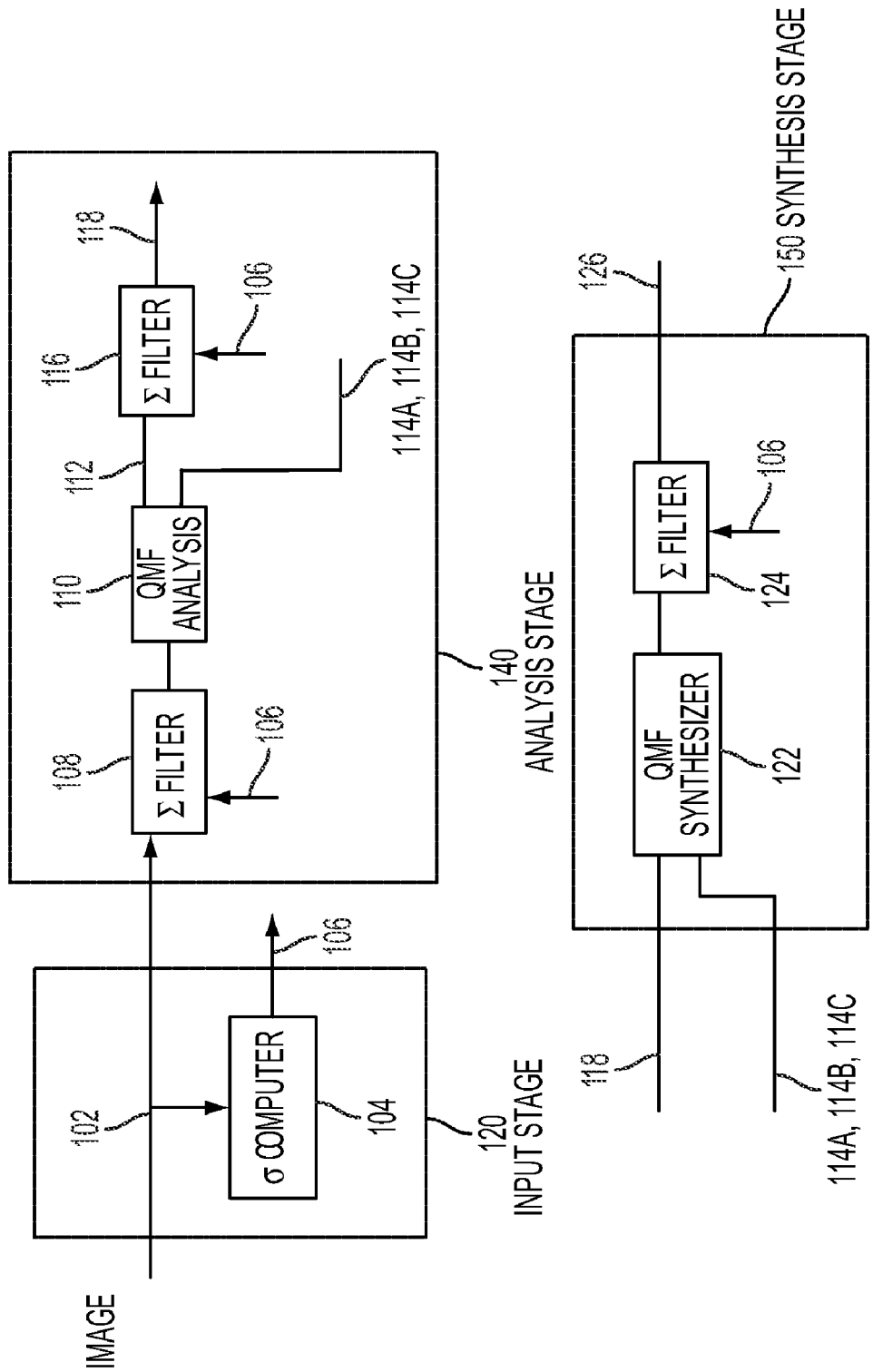
FIG. 1 illustrates a block diagram of a filter for reducing or eliminating noise in a digital image.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

FIG. 1 illustrates a block diagram of a filter for reducing or eliminating noise in a digital image. The filter is composed of an input circuit 120, an analysis circuit 140, and a synthesis circuit, 150. As illustrated in FIG. 1, a digital image 102 is input to input circuit 120. As part of the image input, a sigma value, 106, is computed from properties of the image in the sigma calculation circuit, 104. These properties might include the variance of the image or other numerical values related to the noise content of the image. The sigma calculation circuit may include as part of the calculation some sort of high pass filter as well. The value of sigma (106) that is computed from the input image is used for all subsequent sigma filtering for this image. Although it is possible to use a common sigma value for all images, the improvement in image quality is greater if the sigma value is computed for each image individually to take full advantage of the actual noise levels and other properties of the image, which are different for different images.

In the analysis stage 140, the input image is first sigma filtered in a sigma filtering circuit 108 using the sigma value 106 previously computed in the sigma calculation circuit 104. After the sigma filtering is done, the image is processed by an analysis filter 110.

Typically, this filter is part of a quadrature mirror filter set. This filter might be a filter using a wavelet basis, for example, the Haar wavelet basis. The analysis filter set 110 consists of a low pass or approximation filter and a set of high pass or detail filters, usually three in number.

The output of the analysis filter 110 is four sub images (112, 114A, 114B, and 114C). All four sub images (112, 114A, 114B, and 114C) are at one half the resolution of the input image, that is each subimage is decimated by a factor of two.

The first of the four sub images (112), the output of the low pass or approximation part, is an image where each pixel represents the low frequency content of the image. The other three sub images (114A, 114B, and 114C), the output of the three high pass filter parts, represent the higher frequency detail present in the original image.

Typically, two of these sub images may represent the detail with an emphasis on two orthogonal directions in the original image while the third detailed sub image may represent the detail at some third angle with respect to the first two orthogonal directions.

In prior art implementations, the detailed images have been modified in some way. For example, in prior art implementations, the detail images have been thresholded to remove small details that are typically noise. Alternatively, the detail images may be quantized in some way. These approaches often introduce artifacts into the filtered image.

The details of the artifacts depend on the specific analysis filter used; for example, if a Haar basis is used, variations in the detail image can result in image blockiness, while other methods can cause ringing at edges.

In contrast, as illustrated in FIG. 1, only the approximation image 112 is filtered. The approximation image 112 is passed through another sigma filtering circuit, 116. This produces a modified approximation image 118. The detail sub images 114 are left unmodified.

As illustrated in FIG. 1, in the synthesis circuit, 150, a synthesis filter 122 is applied to recombine the detail sub images (114A, 114B, and 114C) and the modified approximation image 118. The synthesis filter is the complement of the analysis filter of the quadrature mirror filter pair. The output of the synthesis filter 122 is optionally further sigma filtered in by another sigma filter 124, thereby resulting in a final filtered image 126.

It is noted that it is more effective to choose the sigma of the sigma filter based upon image statistics for each image. Having an image dependent sigma allows aggressive filtering in images with a lot of noise and light filtering in high quality originals. One effective procedure is to high pass filter the image and to use its standard deviation to set the sigma of the filter. When calculating the standard deviation, large values are ignored, as these are assumed to be the result of image content, not noise.

As previously mentioned, sigma filters are slow because sigma filters typically use a relatively large filter kernel of sizes like 15×15. A large kernel means that the processing needed to implement the sigma filter is relatively large and hence slow. For example, for a 15×15 kernel, at each pixel the computation includes the contributions of 225 nearby pixels to the filter output.

Figure 2:
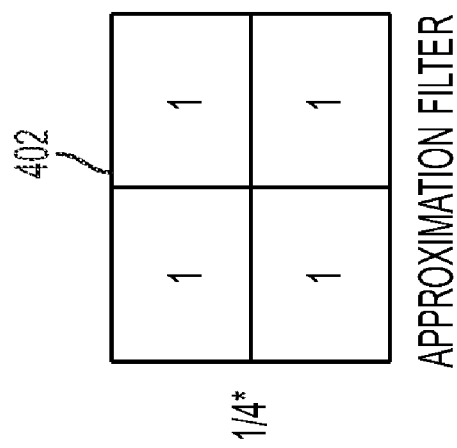
FIG. 2 illustrates a set of analysis filter kernels.
Figure 2:
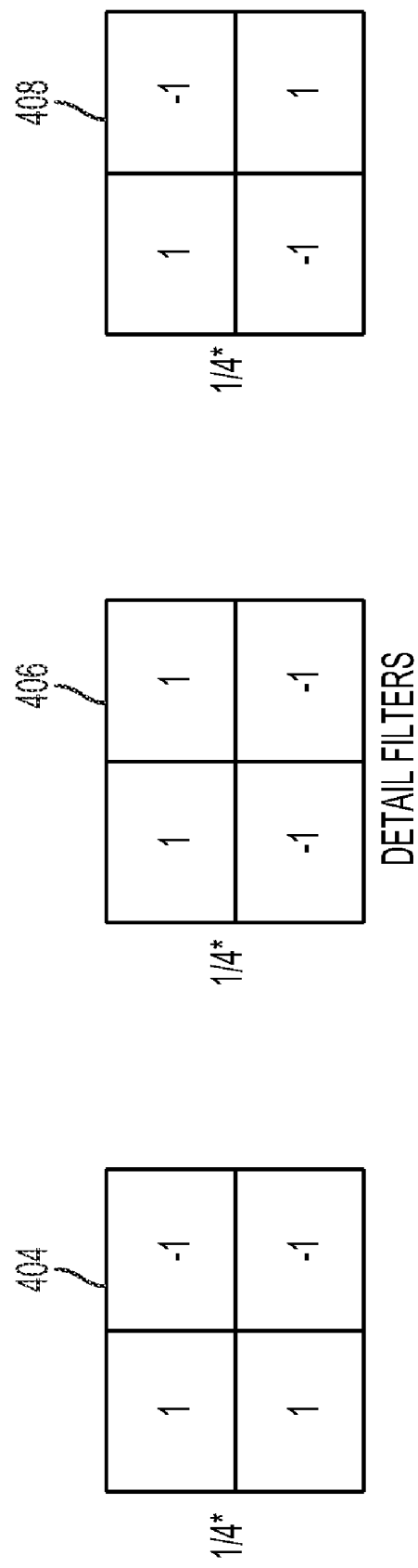

In contrast, the sigma filter, described above, utilize a small relatively kernel wherein even a filter kernel as small as 3×3 is effective in reducing image noise. This reduction in the filter kernel size corresponds to a significant reduction in computing requirements which typically scale roughly as the square of the kernel size. Since only the approximation part of the analyzed image is filtered, a simpler set of coefficients for the analyzer filter can be used. For example, a 2×2 Haar basis consisting of the filter kernels shown in FIG. 2 works well. The approximation filter kernel 202 is a simple average, while the three detail filter kernels 204, 206, and 208 filter the horizontal, vertical, and diagonal details of the image.

When only the approximation part of the analyzed image is filtered, all noise that makes its way into the detail sub images will not be filtered from the image. Thus, the sigma filter 106, as illustrated in FIG. 1, removes substantially all noise associated with the frequency band of the detail sub images before the analysis filter 110 or the noise will never be removed.

An example of a sigma filter to substantially remove all noise associated with the frequency band of the detail sub images before the analysis filter 110 would have a frequency response that has small gain (i.e. large attenuation) when the analysis filter 110 has large gain, since the analysis filter 110 is the filter whose output is the detail sub images.

In general, the sigma filter may be a complementary filter to the analysis filter. If the analysis filter is a quadrature mirror high pass filter, the sigma filter may be a quadrature mirror low pass filter.

Figure 3:
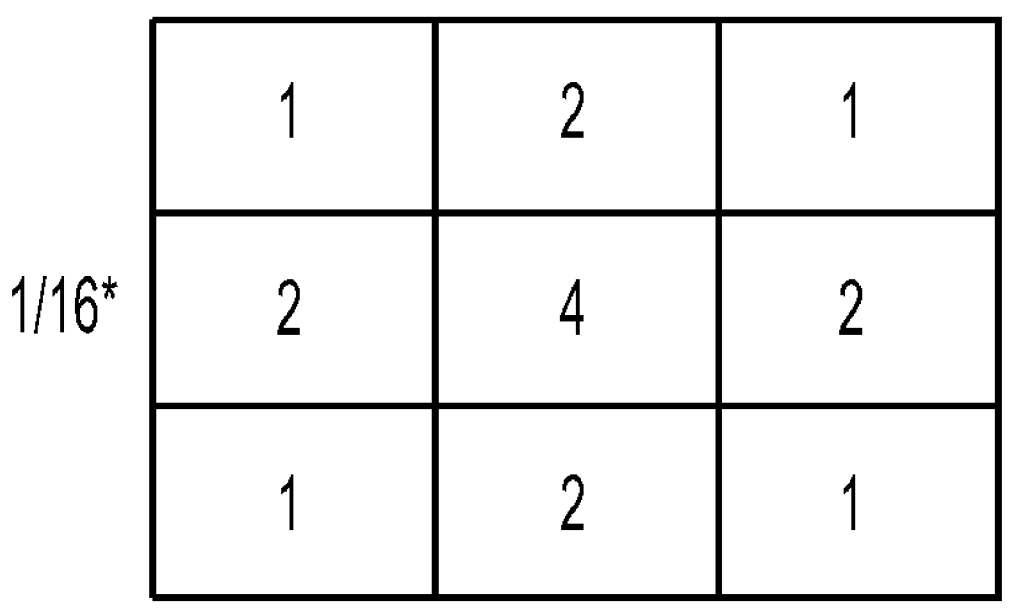

As noted above, the sigma filter kernel can be as small as 3×3. This size provides sufficient high frequency rejection and is centered on the pixel of interest. A filter kernel, which meets these requirements and can be implemented by simple shift and add operations, as shown in FIG. 3. The shift and add feature means that the hardware implementation is particularly simple.

The implementation, as shown in FIG. 1, uses only one stage of filtering. However, recursively repeating the analysis stages may be utilized. The number of stages is arbitrary and is chosen based upon how much filtering is desired in the image.

For example, if the original image is at a resolution of 600 lpi and it is desired to filter to a level of about 100 lpi, three stages of filtering would suffice. Three stages would reduce the effective resolution of the approximation image from 600 to 300 to 150 then to 75 lpi as the image passes through the three stages.

With respect to computing efficiency, it is noted that each stage takes only ¼ of the time to perform when compared with the previous stage because of the decimation by two. It is further noted that increasing the number of stages makes the filter equivalent to a much larger single stage sigma filter. It can be shown that the equivalent filter size is given by: $4*2^{stages}-1$. This means that for two stages, an effective filter size of 15×15 is realized.

By comparison, if a 15×15 sigma filter is implemented directly, the 15×15 sigma filter would take 25 times as long as a single stage 3×3 filter. Thus, the described system and methodology requires only about 32% more time than a single stage 3×3 filter.

Figure 4:
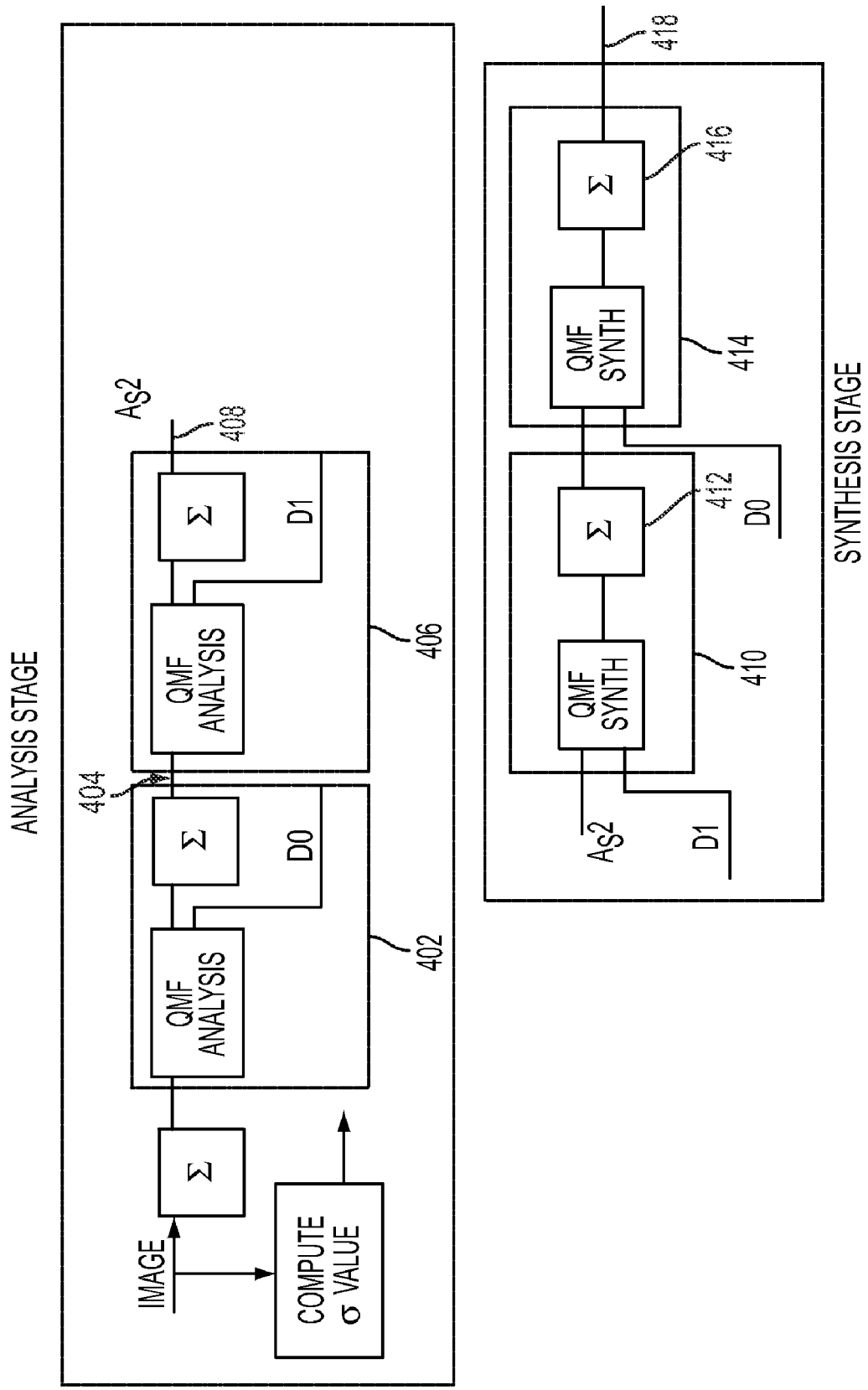
FIG. 4 illustrates a block diagram of another filter for reducing or eliminating noise in a digital image.

FIG. 4 shows an extension of FIG. 1 to multiple stages. The input stage is identical to the input stage of FIG. 1. As illustrated, a first analysis filter stage 402 produces four sub images, an approximation image and three detail images. The approximation image is processed by a second analysis filter stage 406 to produce four additional sub images, a second approximation image and three additional detail images. Although FIG. 4 illustrated only two stages, the concept can be extended to any number of stages.

The output 408 (approximation image or approximation part) of the last analysis stage (406) is passed to a synthesis filter 410. The detail sub images D1 (detailed part of the last stage) is passed into the detailed part of the synthesis stage 410, while the approximation part is passed to the approximation part of the synthesis filter in stage 410.

The output of synthesis stage 410 can be optionally sigma filtered in by a sigma filter 412. The synthesis process may continue in another synthesis stage 414 wherein the output of synthesis stage 410 is combined with the detailed sub images D0 from the analysis filter stage 402. The output of synthesis stage 410 can be optionally sigma filtered in by a sigma filter 416 producing the final filtered image 418.

It is noted that the analysis process of FIG. 4 may included many stages. It is further noted that the synthesis process should include a number of stages equal to the number of stages in the analysis process. With respect to the synthesis process, each stage receives a detail part from the stages of the analysis process. The correspondence of the detail parts to the appropriate synthesis stage is last produce, first to be synthesized. In other words, the detail parts are fed to the synthesis stages in reverse order of generation.

Figure 5:
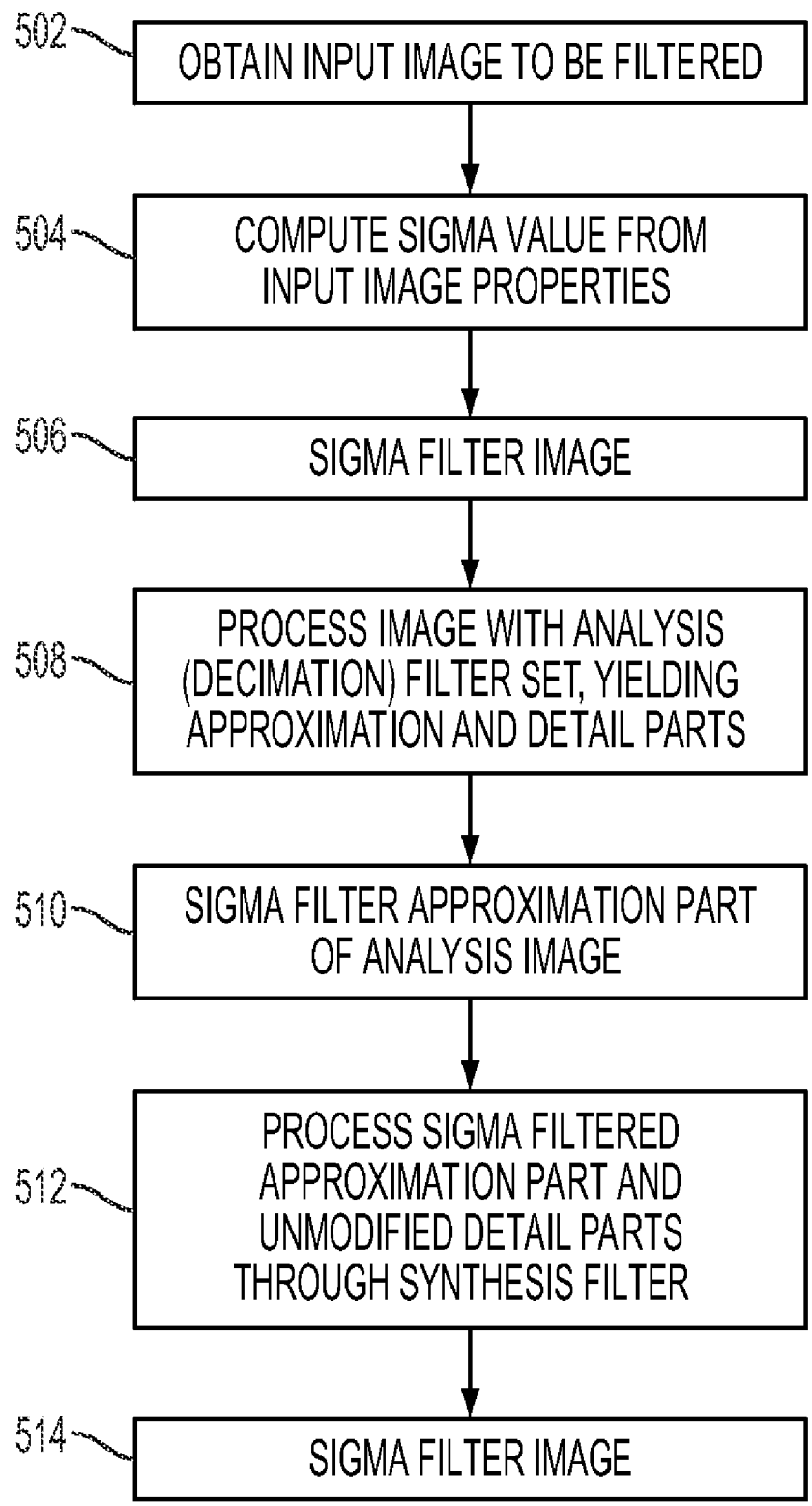
FIG. 5 is a flowchart showing a process for reducing or eliminating noise in a digital image.

Finally, the process may be implemented in software. Accordingly, as shown in FIG. 5, an image is acquired is acquired at step 502. At step 504, the sigma value to be used in subsequent sigma filtering operations is computed from the input image. As described above, this computation may include some sort of high pass filtering and subsequent variance calculation.

The image is sigma filtered at step 506. The sigma filtering uses a relatively small filter kernel, typically 3×3. After the sigma filtering, the filtered image is processed by an analysis filter, at step 508. The output of the analysis filter is four subimages—one approximation part and three detail part. All the subimages are decimated by 2, the subimages are ½ the resolution of the input image. It is noted that when combined, the subimages contain all of the information in the original image, but distributed between the four sub images.

Processing continues with a sigma filter applied to the approximation part of the output at step 508. The detail parts that are output from the processing at step 508 are left untouched at this stage. At step 510, the approximation part is again sigma filtered. At step block 512, the sigma filtered approximation part and the three detail parts are recombined in a synthesis filter.

The synthesis filter kernel is the quatrature mirror pair of the analysis filter kernels at step 508. Afterwards, the output of the synthesis, at step 512, may be optionally sigma filtered one more time at step 514.

It is possible to extend the processing in FIG. 5 to multiple stages as well. In this case, a number of analysis stages are cascaded followed by an identical number of synthesis stages. The number of stages to be used depends on the level of detail to preserve and the computational burden that multiple stages impose.

A method for improving the quality of a digital image by obtaining a digital image; sigma filtering the image to produce a filtered input image; analysis processing the sigma filtered input image to produce an approximation part and a detail part; sigma filtering the approximation part to produce a filtered approximation part; and synthesizing the filtered approximation part and the detail part to generate a reconstructed filtered image. The synthesizing of the filtered approximation part and the detail part may include analysis processing the filtered approximation part to produce a second approximation part and a second detail part; sigma filtering the second approximation part to produce a second filtered approximation part; synthesizing the second filtered approximation part and the second detailed part to produce a first reconstructed image; and synthesizing the first reconstructed image and the first detail part to produce a final filtered image. It is noted that the first reconstructed image may be sigma filtered prior to synthesizing the first reconstructed image and the first detail part to produce a final filtered image.

A sigma value for the sigma filtering for each image can be determined. The determining of the sigma value high pass filters the image; determines a standard deviation of the high pass filtered image; and uses the determined standard deviation as the sigma value wherein the determined standard deviation is used as the sigma value when the determined standard deviation is less than a predetermined value.

A system for improving the quality of a digital image may include a first sigma filtering circuit to sigma filter an image to produce a filtered image; an analysis circuit to process the sigma filtered image to produce an approximation part and a detail part; a second sigma filter circuit to filter the approximation part to produce a sigma filtered approximation part; and a synthesizer to combine the sigma filtered approximation part and the detail part to generate a reconstructed filtered image.

The system may further include a sigma circuit, operatively connected to said first and second sigma filter circuits, to determine a sigma value from the image. The sigma circuit may include a high pass filter circuit to high pass filter the image and a circuit to determine a standard deviation of the high pass filtered image, the determined standard deviation being the sigma value wherein the determined standard deviation is used as the sigma value when the determined standard deviation is less than a predetermined value.

It is noted that the filter circuit and the synthesizer may form a quadrature mirror pair.

Another system for improving the quality of a digital image may include a first sigma filtering circuit to sigma filter an image to produce a filtered image; a first analysis circuit to process the sigma filtered image to produce an approximation part and a detail part; a second sigma filter circuit to filter the approximation part to produce a sigma filtered approximation part; a second analysis circuit to process the sigma filtered approximation part to produce a second approximation part and a second detail part; a third sigma filter circuit to sigma filter the second approximation part to produce a sigma filtered second approximation part; a first synthesizer to synthesize the sigma filtered second approximation part and the second detailed part to produce a first reconstructed image; and a second synthesizer to synthesize the first reconstructed image and the first detail part to produce a final filtered image.

It is noted that the first filter circuit and the first synthesizer may form a quadrature mirror pair, and the second filter circuit and the second synthesizer may form a quadrature mirror pair.

A sigma circuit may be used to determine a sigma value from the image. The sigma circuit may include a high pass filter circuit to high pass filter the image; and a circuit to determine a standard deviation of the high pass filtered image, the determined standard deviation being the sigma value wherein the determined standard deviation is used as the sigma value when the determined standard deviation is less than a predetermined value.

A fourth sigma filter to sigma filter the first reconstructed image to produce a filtered first reconstructed image may be included wherein the second synthesizer synthesizes the filtered first reconstructed image and the first detail part to produce a final filtered image.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for improving the quality of a digital image comprising:
   (a) obtaining a digital image;
   (b) sigma filtering the digital image to produce a sigma filtered input image;
   (c) analysis processing the sigma filtered input image to produce an approximation part and a detail part;
   (d) sigma filtering the approximation part to produce a sigma filtered approximation part; and
   (e) synthesizing the sigma filtered approximation part and the detail part to generate a reconstructed filtered image.

2. The method as claimed in claim 1, wherein synthesizing the filtered approximation part and the detail part comprises:
   (e1) analysis processing the sigma filtered approximation part to produce a second approximation part and a second detail part;
   (e2) sigma filtering the second approximation part to produce a sigma filtered second approximation part;
   (e3) synthesizing the sigma filtered second approximation part and the second detail part to produce a first reconstructed image; and
   (e4) synthesizing the first reconstructed image and the detail part to produce the final filtered image.

3. The method as claimed in claim 1, wherein the analysis processing of the sigma filtered input image and the synthesizing of the sigma filtered approximation part and the detail part have a quadrature mirror pair relationship.

4. The method as claimed in claim 1, further comprising determining a sigma value for the sigma filtering for the digital image.

5. The method as claimed in claim 4, wherein the determining of the sigma value comprises:
   high pass filtering the digital image;
   determining a standard deviation of the high pass filtered image; and using the determined standard deviation as the sigma value.

6. The method as claimed in claim 5, wherein the determined standard deviation is used as the sigma value when the determined standard deviation is less than a predetermined value.

7. The method as claimed in claim 2, further comprising:
(e3a) sigma filtering first reconstructed image prior to synthesizing the first reconstructed image and the detail part to produce the final filtered image.

8. A system for improving the quality of a digital image comprising:
a first sigma filtering circuit to sigma filter digital image to produce a sigma filtered image;
an analysis circuit to process the sigma filtered image to produce an approximation part and a detail part;
a second sigma filter circuit to filter the approximation part to produce a sigma filtered approximation part; and
a synthesizer to combine the sigma filtered approximation part and the detail part to generate a reconstructed filtered image.

9. The system as claimed in claim 8, further comprising:
a sigma circuit, operatively connected to said first and second sigma filter circuits, to determine a sigma value from the digital image.

10. The system as claimed in claim 9, wherein said sigma circuit comprises:
a high pass filter circuit to high pass filter the digital image; and
a circuit to determine a standard deviation of the high pass filtered image, the determined standard deviation being the sigma value.

11. The system as claimed in claim 10, wherein the determined standard deviation is used as the sigma value when the determined standard deviation is less than a predetermined value.

12. The system as claimed in claim 8, wherein said analysis circuit and said synthesizer form a quadrature mirror pair.

13. A system for improving the quality of a digital image comprising:
a first sigma filtering circuit to sigma filter a digital image to produce a sigma filtered image;
a first analysis circuit to process the sigma filtered image to produce an approximation part and a detail part;
a second sigma filter circuit to filter the approximation part to produce a sigma filtered approximation part;
a second analysis circuit to process the sigma filtered approximation part to produce a second approximation part and a second detail part;
a third sigma filter circuit to sigma filter the second approximation part to produce a sigma filtered second approximation part;
a first synthesizer to synthesize the sigma filtered second approximation part and the second detail part to produce a first reconstructed image; and
a second synthesizer to synthesize the first reconstructed image and the detail part to produce a final filtered image.

14. The system as claimed in claim 13, wherein said first analysis circuit and said first synthesizer form a quadrature mirror pair.

15. The system as claimed in claim 13, wherein said second analysis circuit and said second synthesizer form a quadrature mirror pair.

16. The system as claimed in claim 14, wherein said second analysis circuit and said second synthesizer form a second quadrature mirror pair.

17. The system as claimed in claim 13, further comprising:
a sigma circuit, operatively connected to said first, second, and third sigma filter circuits, to determine a sigma value from the digital image.

18. The system as claimed in claim 17, wherein said sigma circuit comprises:
a high pass filter circuit to high pass filter the digital image; and
a circuit to determine a standard deviation of the high pass filtered image, the determined standard deviation being the sigma value.

19. The system as claimed in claim 18, wherein the determined standard deviation is used as the sigma value when the determined standard deviation is less than a predetermined value.

20. The system as claimed in claim 13, further comprising:
a fourth sigma filter to sigma filter the first reconstructed image to produce a sigma filtered first reconstructed image;
said second synthesizer synthesizing the sigma filtered first reconstructed image and the detail part to produce the final filtered image.

* * * * *